No. 717,543. PATENTED JAN. 6, 1903.
R. P. CHARLES & C. C. DETHERAGE.
HAND OPERATED TOOL.
APPLICATION FILED MAY 23, 1902.
NO MODEL. 2 SHEETS—SHEET 1.
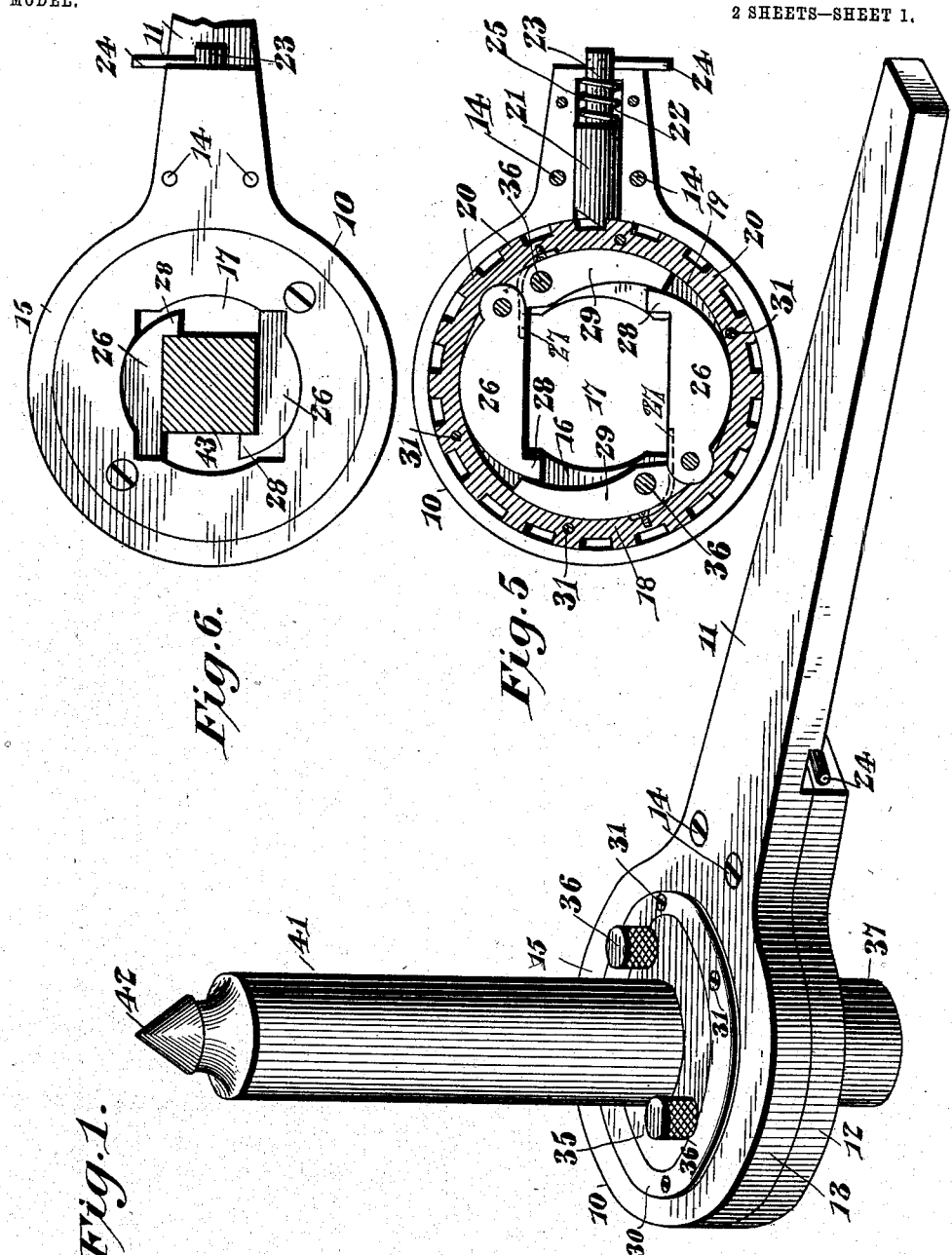

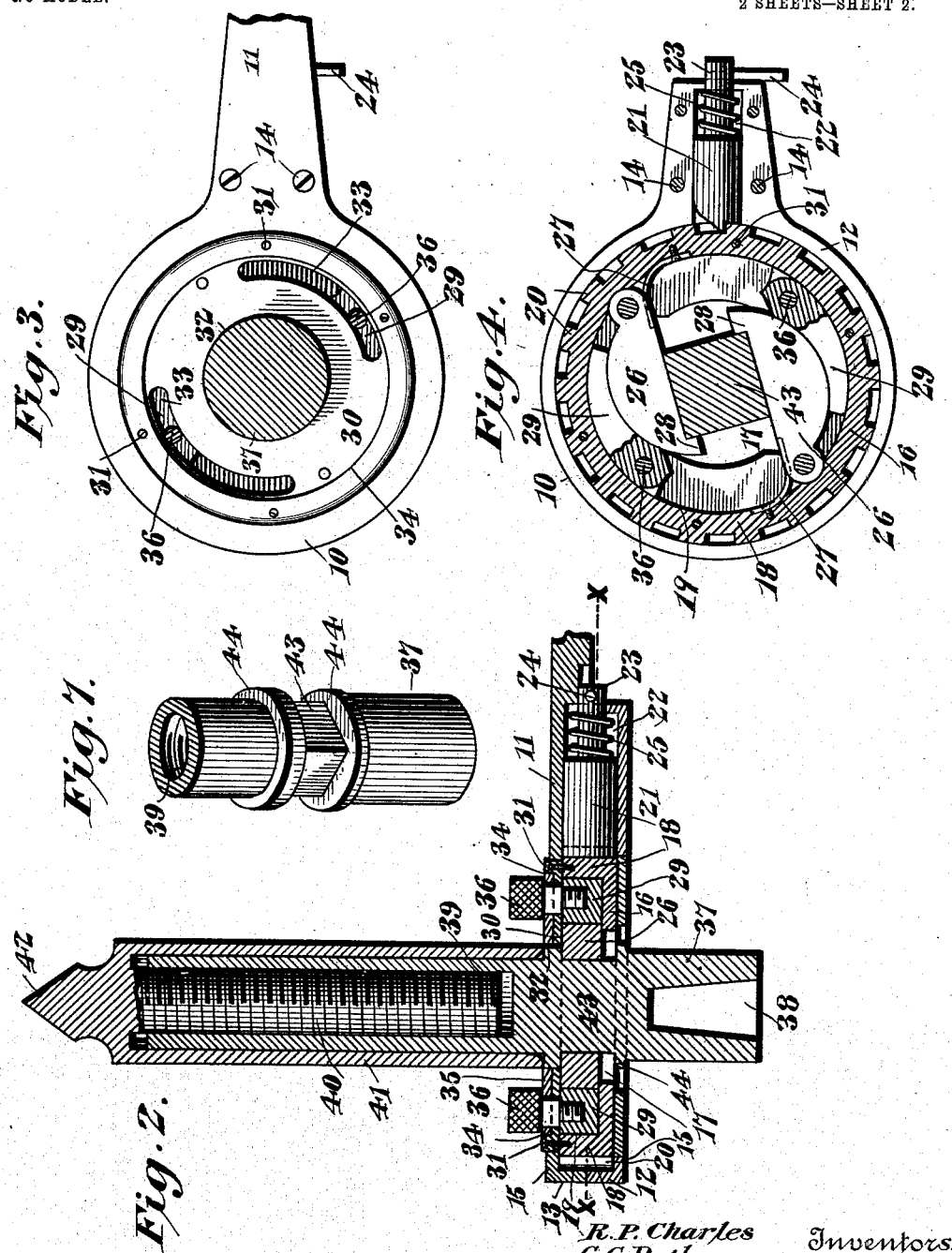

United States Patent Office.

RITCHARD PAUL CHARLES AND CHARLES CLARANCE DETHERAGE, OF BRISTOL, TENNESSEE.

HAND-OPERATED TOOL.

SPECIFICATION forming part of Letters Patent No. 717,543, dated January 6, 1903.

Application filed May 23, 1902. Serial No. 108,648. (No model.)

*To all whom it may concern:*

Be it known that we, RITCHARD PAUL CHARLES and CHARLES CLARANCE DETHERAGE, citizens of the United States, residing at Bristol, in the county of Sullivan and State of Tennessee, have invented a new and useful Hand-Operated Tool, of which the following is a specification.

This invention relates to a hand-operated tool that may be employed as a wrench, a drill, or the like.

One of the objects of the invention is to provide a wrench having movable jaws and to employ novel means for adjusting the same and holding them when so adjusted, said means being simple and at the same time entirely efficient.

Another object is to provide an extremely simple form of drill or tool-holding spindle arranged especially for use in connection with the improved wrench.

The preferred embodiment of the invention is fully illustrated in the accompanying drawings, wherein—

Figure 1 is a perspective view of the improved tool. Fig. 2 is a longitudinal sectional view through the same. Fig. 3 is a horizontal sectional view with the cap-plate removed, the remaining portions of the wrench being shown in elevation. Fig. 4 is a horizontal sectional view taken on the line $x\,x$ of Fig. 2 and showing the jaws in coacting position upon the tool-holding spindle. Fig. 5 is a similar view with the jaws retracted. Fig. 6 is a bottom plan view of the wrench. Fig. 7 is a detail perspective view of a portion of the tool-holding spindle.

Similar numerals of reference designate corresponding parts in all the figures of the drawings.

In carrying out the invention a casing 10 is employed, from one side of which projects an operating-handle 11. This casing comprises two sections 12 and 13, secured together by means of screws 14, said sections having coacting side walls and inturned flanges 15. Within the casing is rotatably mounted a head 16, having an opening 17 therethrough, said head being provided with an annular flange 18 around its peripheral edge, thereby forming a seat 19. The head, furthermore, is provided with an annular series of ratchet-teeth 20, arranged to be engaged by the inclined end of a dog 21, slidably mounted in a socket 22, formed in the adjacent faces of the casing-sections 12 and 13. The dog is provided with a shank 23, that projects through the casing and has a handle-piece 24 on its exposed end. A resistance-spring 25 is interposed between the head of the dog and the opposite end of the socket to urge the said dog into engagement with the ratchet-teeth, as shown. As a result it will be seen that the dog will permit the free movement of the head in one direction while preventing its movement in the other. To reverse the movement of the head, however, it is only necessary to retract the dog and to revolve it half-way, thereby reversing the inclined end, as will be readily understood.

Pivotally mounted in the seat 19 are a pair of coacting jaws 26, that are movable over the opening 17, but are normally held in retracted position by means of springs 27, bearing against their pivoted ends and preferably secured to the inner faces of the flange 18. The free ends of the jaws are preferably provided with inwardly-extending lugs 28. Slidably mounted within the seat 19 are wedges 29, that are movable between the flange 18 and the jaws to move said jaws toward each other and over the opening 17. A cover 30 closes the open side of the seat 19, being secured to the head by means of screws 31, which engage in the flange 18. This cover has a central opening 32 and a pair of oppositely-disposed slots 33 concentric with said opening. Furthermore, the cover has a depressed portion 34, within which is rotatably mounted a cap-plate 35, said cap-plate being also provided with a central opening. Set-screws 36 pass through the cap-plate and the slots of the cover and are threaded into the enlarged ends of the slidable wedges.

In connection with the above-described wrench there is employed a drill or tool-holding spindle, which comprises a stock 37, having in its lower end a tool-receiving socket 38 and in its upper end a threaded seat 39, which receives a screw-shank 40, arranged within the sleeve 41. This sleeve is provided at its upper end with the usual bearing 42 and is large enough to receive the upper end of the stock 37. Said stock is provided with an intermediate angular portion 43 and integral flanges 44, located at the opposite ends of said angular portion.

The manner of adjusting the jaws is as follows: When not in use, they are retracted, as shown in Fig. 5. Should it be desired to use the device upon a nut or other angular article, the wrench-head is placed over said article, the set-screws 36 are loosened, and the cap-plate rotated, thereby simultaneously moving the wedges 29 behind the jaws and swinging said jaws inwardly into engagement with the article, as shown in Fig. 4. When the proper adjustment has been obtained, the set-screws are again tightened. This action, as will be evident by reference to Fig. 2, will clamp the cover 30 between the cap-plate 35 and the wedges, consequently locking said wedges against any accidental movement. Upon oscillating the handle the head will be rotated, consequently rotating the article held by the jaws. In using the wrench upon the tool-holding spindle shown the same action above described takes place, the spindle being passed through the opening 17 until the squared or angular portion 43 is in alinement with the jaws. When the jaws are clamped upon this angular portion, the spindle is securely fastened to the head and the integral flanges 44 will prevent any longitudinal movement of the spindle.

It will therefore be seen that an extremely simple wrench is provided, which may be securely clamped upon a nut or other article and is not liable to become accidentally displaced from said article. The wedges impart a powerful clamping action to the jaws, and, furthermore, said wedges can be securely locked against movement at any point desired. The head may be rotated in either direction by the oscillation of the handle, and when the wrench is employed upon the spindle shown it will be evident that there can be no relative movement between said spindle and head.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described our invention, what we claim as new, and desire to secure by Letters Patent, is—

1. In a tool of the class described, the combination with a head, of coacting jaws each pivotally mounted at one end upon the head, oppositely-moving wedges slidably mounted upon the head and engaging the free ends of the jaws to move them toward each other, and means for moving the wedges.

2. In a tool of the class described, the combination with a head having an opening, of coacting jaws pivoted to the head and arranged to swing into coacting relation over the opening, oppositely-moving, separate wedges slidably mounted upon the head in rear of the jaws, and means for simultaneously actuating the wedges.

3. In a tool of the class described, the combination with a head having an opening and an annular flange forming a seat, of coacting jaws pivoted to the head and located within the seat, said jaws being arranged to swing into coacting relation over the opening, oppositely-moving, separate wedges slidably mounted upon the head between the flange and the jaws, and means for moving the wedges.

4. In a tool of the class described, the combination with a head, of coacting jaws arranged in opposing relation and pivoted to the head at their opposite ends, said jaws being arranged to swing into coacting relation, separate means for swinging each jaw upon its pivot and toward the other jaw, and springs engaging the pivoted ends of the jaws to swing them apart.

5. In a tool of the class described, the combination with a head having a seat and an opening, of coacting jaws arranged within the seat on opposite sides of the opening and pivoted at their opposite ends, said jaws being arranged to swing into coacting relation across the opening, oppositely-moving wedges slidably mounted in the seat and movable behind the free ends of the jaws, and separate springs secured to the head and bearing against the pivoted ends of the jaws to move them apart.

6. In a tool of the class described, the combination with a head having a seat, of jaws movably located in the seat, wedges movably mounted in the seat and engaging the jaws, a stationary cover for said seat secured to the head and having slots, and means for moving the wedges, said means passing through and being movable in the slots of the cover.

7. In a tool of the class described, the combination with a head having a seat, of jaws pivotally mounted in the seat, wedges slidably mounted in the seat and engaging the jaws, a cover for said seat having slots, a cap-plate rotatably mounted upon the cover, and set-screws passing through the cap-plate and the slots in the cover, said set-screws having threaded engagement with the wedges.

8. In a tool of the class described, the combination of a head having a seat, of jaws movably mounted in the seat, wedges slidably mounted in the seat and engaging the jaws, a stationary cover detachably secured to the head over the seat and having slots, said cover being provided with a circular depressed portion, a cap-plate rotatably mounted in the depressed portion of the cover, and set-screws passing through the cap-plate and the slots of the cover, said set-screws having threaded engagement with the wedges.

9. In a tool of the class described, the combination with a casing having a handle, of a head rotatably mounted in the casing and having a seat, a ratchet-dog carried by the casing and engaging the head, jaws oppositely pivoted within the seat and arranged to swing into coacting relation, springs engaging the jaws to move them outwardly, oppositely-moving, separate wedges slidably mounted in the seat to move the jaws inwardly, and means for moving the wedges.

In testimony that we claim the foregoing as our own we have hereto affixed our signatures in the presence of two witnesses.

RITCHARD PAUL CHARLES.
CHARLES CLARANCE DETHERAGE.

Witnesses:
E. S. GEDSEY,
M. B. OWEN.